(12) United States Patent
Weschke, Jr. et al.

(10) Patent No.: US 10,807,512 B2
(45) Date of Patent: Oct. 20, 2020

(54) SHIPPING SYSTEM AND METHOD FOR ROLLING TARP SYSTEMS

(71) Applicant: Tarpstop, LLC, Perrysburg, OH (US)

(72) Inventors: Kenneth R. Weschke, Jr., Perrysburg, OH (US); Joseph G. Callahan, Maumee, OH (US)

(73) Assignee: Tarpstop, LLC, Perrysburg, OH (US)

( * ) Notice: Subject to any disclaimer, the term of this patent is extended or adjusted under 35 U.S.C. 154(b) by 142 days.

(21) Appl. No.: 15/924,512

(22) Filed: Mar. 19, 2018

(65) Prior Publication Data

US 2018/0264987 A1 Sep. 20, 2018

Related U.S. Application Data

(60) Provisional application No. 62/472,934, filed on Mar. 17, 2017.

(51) Int. Cl.
| | | |
|---|---|---|
| *B60P 7/08* | (2006.01) | |
| *B62D 63/08* | (2006.01) | |
| *B60P 7/14* | (2006.01) | |
| *B62D 33/02* | (2006.01) | |
| *B62D 53/06* | (2006.01) | |

(52) U.S. Cl.
CPC .............. *B60P 7/0815* (2013.01); *B60P 7/14* (2013.01); *B62D 33/02* (2013.01); *B62D 53/061* (2013.01); *B62D 63/08* (2013.01)

(58) Field of Classification Search
CPC ...... B65D 19/44; B65D 25/10; B65D 88/129; B65D 85/68; B65D 2519/00024; B65D 2519/00059; B65D 2519/00293; B60P 3/40; B60P 3/00; B60P 7/15; B60P 3/05; B60P 3/41; B60P 7/06; B60P 7/0807; B60P 7/135; B60P 1/00
USPC ...... 410/31, 32, 43, 46, 121, 155, 2, 56, 97, 410/88, 86, 68; 206/386, 319, 512, 321, 206/509, 443, 821, 600; 414/800, 267, 414/678, 234, 261, 350, 912, 812, 809, 414/802
See application file for complete search history.

(56) References Cited

U.S. PATENT DOCUMENTS

| | | | | |
|---|---|---|---|---|
| 1,529,223 A | * | 3/1925 | Stoll ..................... | B65G 63/025 104/29 |
| 2,304,418 A | * | 12/1942 | McMurry ............. | B60P 1/6436 410/67 |
| 3,180,281 A | * | 4/1965 | Sherrie ................ | B61D 45/007 410/78 |
| 3,481,627 A | | 12/1969 | Felburn | |
| 3,891,102 A | * | 6/1975 | Blount ................. | B60P 1/4421 414/545 |
| 5,538,313 A | * | 7/1996 | Henning ................. | B60J 7/065 296/100.12 |

(Continued)

*Primary Examiner* — D Glenn Dayoan
*Assistant Examiner* — Sunsurraye Westbrook
(74) *Attorney, Agent, or Firm* — MacMillan, Sobanski & Todd, LLC

(57) ABSTRACT

A shipping system for a rolling tarp system has a trailer bed and first and second guide tracks attached to the trailer bed. The trailer bed has a towing element that defines front, sides, and rear portions. The first and second guide tracks are transverse to the trailer sides and configured to support the rolling tarp system. The rolling tarp system is loaded on and unloaded off the first and second guide tracks along the side of the trailer bed.

19 Claims, 13 Drawing Sheets

(56) References Cited

U.S. PATENT DOCUMENTS

| | | | | |
|---|---|---|---|---|
| 6,499,783 B1* | 12/2002 | Husted | ............... | B60P 3/04 |
| | | | | 119/405 |
| 6,634,697 B1* | 10/2003 | Petelka | ............... | B60J 7/062 |
| | | | | 296/100.12 |
| 7,229,120 B2 | 6/2007 | Tuerk et al. | | |
| 8,303,017 B2* | 11/2012 | LeBlanc | ............ | B62D 33/0207 |
| | | | | 105/380 |
| 8,454,076 B2* | 6/2013 | Bourcier | ............... | B60J 7/102 |
| | | | | 296/100.18 |
| 8,839,743 B2* | 9/2014 | Chandler | ............ | A01K 1/0236 |
| | | | | 119/519 |
| 9,212,502 B1* | 12/2015 | Siewert | ............... | B60J 7/102 |

* cited by examiner

SHIPPING SYSTEM AND METHOD FOR ROLLING TARP SYSTEMS

CROSS REFERENCE TO RELATED APPLICATION

This application claims priority to, and the benefit of, U.S. Provisional Application Ser. No. 62/472,934, filed Mar. 17, 2017, the disclosure of which is hereby incorporated herein by reference in its entirety.

BACKGROUND OF THE INVENTION

This invention relates in general to shipping systems, and in particular, to a shipping system for shipping rolling tarp systems.

Flatbed trailers are often used to haul loads that are bulky or heavy. These loads often have handling characteristics that rely on access to the open sides of the trailer for loading and unloading. Flatbed trailers provide open access for handling freight but lack a structure for conveniently covering the loads from the elements or for privacy. Thus, tarps are often used to protect freight carried on a flatbed. Sometimes the tarps are applied directly over the loads to guard against the elements. Other flatbed covers define an enclosed cargo space and provide access to the cargo therein. One such type of accessible tarp covering is a rolling tarp system that relies on bows and other support structures secured to guide tracks to create a space over the trailer and support one or more tarp sheets.

Sometimes, the rolling tarp system is assembled and then shipped for later final installation at a customer site. As is known in the art and disclosed in U.S. Pat. No. 7,229,120, shipping rolling tarp systems on a flatbed trailer relies on assembling, compressing, and installing the individual systems. The compressed rolling tarp systems are sequentially loaded onto a shipping trailer in a similar manner as conventional custom installation on the customer's flatbed trailer for regular use. Installation for shipping involves sequencing, supporting, and stacking the compressed rolling tarp systems on guide tracks that are continuous along the length of the flatbed trailer and are parallel to a direction of travel for the flatbed trailer. The length of the trailer, which is generally parallel to the direction of travel, is defined by the sides of the trailer and establishes an longitudinal dimension of the trailer. As such, the guide tracks permit selective longitudinal movement of the various compressed rolling tarp systems along the direction of travel during loading and unloading for shipping. The guide track orientation also restricts lateral movement—i.e., transverse to the direction of travel—of the compressed rolling tarp systems to retain the compressed rolling tarp systems on the flatbed trailer. This shipping method utilizes conventional flatbed trailers having such guide tracks—i.e., parallel and extending in the direction of travel—that are common and readily available for shipping the rolling tarp system without modification, special provisions, or adaptations of the rolling tarp system or flatbed trailer.

This method of shipping rolling tarp systems presents issues of sequencing the loads so that they can be unloaded in a last on, first off (LIFO) method. Such an arrangement reduces flexibility in handling and accommodating delivery schedule changes. For example, unloading the forward-most unit requires removing the later loaded units first, increasing the potential for damage. In addition, this method does not accommodate rolling tarp systems having widths different from the shipping trailer because the rolling tarp systems that may be loaded on a given flatbed trailer are limited to those that fit a width between the fixed guide tracks. A customer who has ordered rolling tarp systems with more than one width may require multiple shipments on different flatbed trailers. Thus, it would be desirable to provide an improved shipping system for rolling tarp systems.

SUMMARY OF THE INVENTION

This invention relates to a shipping system for rolling tarp systems having improved compatibility with different size rolling tarp systems and access for loading and unloading the rolling tarp systems.

In one embodiment, a shipping system for a rolling tarp system has a trailer and first and second guide tracks attached to the trailer. The trailer has a towing element defining a front portion and lateral axis of the trailer. The trailer further includes sides of the trailer located generally perpendicular to the front portion and defining a longitudinal axis of the trailer. The trailer further having a support surface configured to carry cargo. The first and second guide tracks are attached to the trailer and configured to support the rolling tarp system. The first and second guide tracks also define a loading bay and are configured to accept and retain the rolling tarp system along the side of the trailer In another embodiment, a shipping system for a rolling tarp system has a trailer and first and second guide tracks. The trailer has a frame including side rails that define a side of the trailer and a support surface. The side rails have side rail pockets and the support surface includes at least one rail having at least one bulkhead pocket. The first and second guide tracks are attached to the side rail pockets and are configured to support the rolling tarp system. The first and second guide tracks also define a loading bay and are configured to accept and retain the rolling tarp system along the side of the trailer.

In yet another embodiment, a shipping system for a rolling tarp system has first and second track supports attached to a flatbed trailer. A trailer has a frame and a support surface, first and second guide tracks, and first and second receivers. The frame includes side rails that define a side of the trailer. The side rails have a plurality of side rail pockets. The support surface includes a plurality of spaced-apart rails each rail having a plurality of bulkhead pockets. The first and second guide tracks are attached to the side rail pockets and define a side accessible loading bay. The first and second guide tracks are configured to retain a compressed rolling tarp system at a first height above the support surface. The compressed rolling tarp system defines a space. The first and second receivers are attached to the bulkhead pockets. The first and second receivers are configured to support a bulkhead above the support surface at a second height. The second height is sufficient to accommodate the height of the bulkhead within the space.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
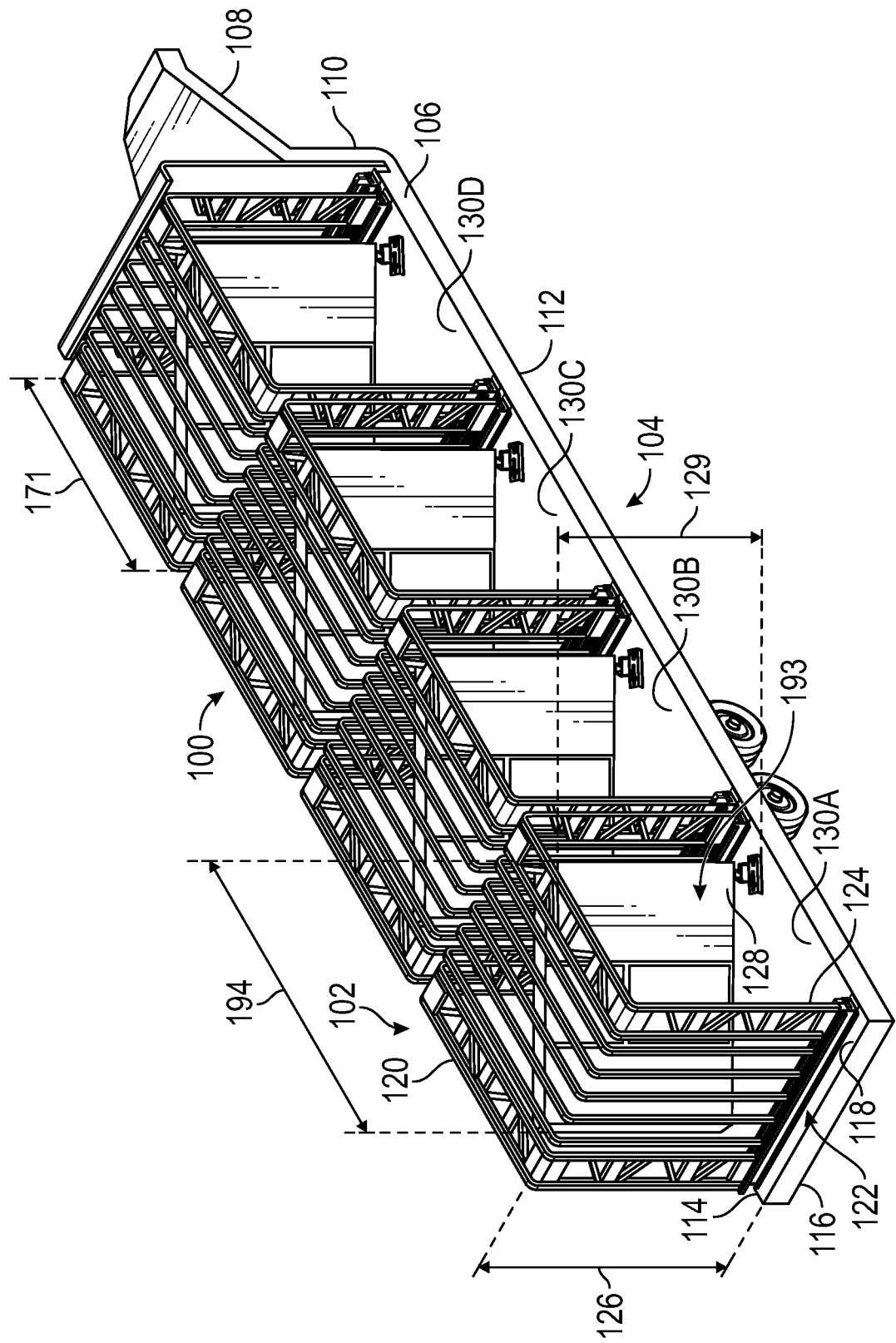
FIG. 1 is a perspective view of an embodiment of a shipping system for rolling tarp systems in accordance with the invention.

Referring now to FIGS. 1-6, there is illustrated a shipping system, indicated generally at 100, for shipping a rolling tarp system, indicated generally at 102. The shipping system 100 is installed for shipping on a transport system, such as a flatbed trailer, indicated generally at 104. Alternatively, the transport system may be other than the illustrated flatbed trailer 104. As non-limiting examples, the transport system may be a railcar, shipping container, handcart, or other structure for shipping or otherwise moving the rolling tarp system 102.

The flatbed trailer 104 is conventional in the art, with a bed portion 106 and a towing element 108. The towing element 108 defines a front portion 110 of the flatbed trailer 104, which may be indicative of a direction in which the flatbed trailer 104 is intended to be towed. First and second sides 112 and 114, respectively, and a rear portion 116 of the flatbed trailer 104 are conventionally defined relative to the front portion 110. A longitudinal axis A-A extends along a length of the trailer and is generally parallel to the trailer sides 112, 114. A lateral axis B-B is generally perpendicular to the longitudinal axis A-A and defines a width of the trailer extending generally parallel to the front portion 110 and rear portion 116 of the trailer from the first side 112 to the second side 114. The bed portion 106 further defines a support surface or trailer deck 118 that forms the support for transporting goods thereon—e.g., the rolling tarp system 102. Although the shipping system 100 is illustrated for use with the flatbed trailer 104, any suitable type of transport system capable of accommodating the rolling tarp system 102 may be used. In certain embodiments, the towing element 108 may be a cab portion of a vehicle, such as a stake truck.

As shown in FIG. 1, a plurality of rolling tarp systems 102 are loaded onto the shipping system 100. The rolling tarp systems 102 may be any type of rolling tarp system, such as the system disclosed in U.S. Pat. No. 9,033,393, the disclosure of which is hereby incorporated herein by reference in its entirety.

In one embodiment, the rolling tarp system 102 includes a plurality of bows including a front bow 120, at least one intermediate bow, indicated generally at 122, and a rear bow 124. The front, intermediate, and rear bows 120, 122, and 124, respectively, are collectively deployable between a compressed or collapsed state and a deployed state. As illustrated in FIG. 1, the front, intermediate, and rear bows 120, 122, and 124, respectively, are in the compressed state on the flatbed trailer 104. A tarp section (omitted for clarity) can be attached over or between the front, intermediate, and rear bows 120, 122, and 124, respectively. Preferably, the shipping system 100 is shipped on the flatbed trailer 104 with the tarp section attached over or between the front, intermediate, and rear bows 120, 122, and 124, respectively. Alternatively, the front, intermediate, and rear bows 120, 122, and 124, respectively, may be shipped without the tarp section attached. As will be discussed, the front, intermediate, and rear bows 120, 122, and 124, respectively, upright and in the compressed state, have a bow or first height 126 above the support surface 118. As illustrated, each of the rolling tarp systems 102 also includes at least one bulkhead 128. The bulkhead 128 is sized to attach to one of the front or rear bows 120 or 124, respectively, to provide an enclosed cargo space once the rolling tarp system 102 is finally installed. As will be discussed, the bulkhead 128, upright, has a bulkhead or second height 129 above the support surface 118.

The shipping system 100 includes first, second, third, and fourth loading bays 130A, 130B, 130C, and 130D, respectively. Each of the rolling tarp systems 102 is loaded into one of the first, second, third, or fourth loading bays 130A, 130B, 130C, or 130D, respectively. Discussion of any one of the first, second, third, or fourth loading bays 130A, 130B, 130C, or 130D, respectively, also applies to the other of the first, second, third, or fourth loading bays 130A, 130B, 130C, or 130D, respectively, unless otherwise stated. Though illustrated as having four loading bays, the shipping system 100 may comprise any number of loading bays. While the lateral axis B-B is shown in conjunction with the fourth loading bay 130D, each of the loading bays may be defined by lateral axes similar to axis B-B for each bay positioned along the length of the trailer.

Referring now specifically to FIGS. 2-6, the first loading bay 130A is illustrated in detail. The first loading bay 130A has substantially parallel first and second guide tracks 132 and 134, respectively, that extend or otherwise span between the first and second sides 112 and 114, respectively. The first and second guide tracks 132 and 134 are generally parallel to the lateral axis B-B associated with the first loading bay 130A. The first guide track 132 is attached to, and supported by, first track supports, indicated generally at 136, and the second guide track 134 is attached to, and supported by, second track supports, indicated generally at 138. The first and second track supports 136 and 138, respectively, are attached to the flatbed trailer 104 and configured to locate the first and second guide tracks 132 and 134, respectively, at a track height 140 above the support surface 118. As will be discussed, the first and second guide tracks 132 and 134, respectively, support the front, intermediate, and rear bows 120, 122, and 124, respectively, at the track height 140. Located between the first and second guide tracks 132 and 134, respectively, are first and second receivers 142 and 144, respectively. The first and second receivers 142 and 144, respectively, are attached to the bed portion 106 of the flatbed trailer 104 to support the bulkhead 128.

There is a first distance or width spacing 146 between the first and second guide tracks 132 and 134, respectively. Furthermore, there is a second or axial distance 148 between the first and second receivers 142 and 144, respectively. As will be discussed, adjustment of the first distance 146 and the second distance 148, independently and together, permits different sizes of the rolling tarp systems 102, with different sizes of the bulkhead 128, to be shipped with the same shipping system 100 on the same flatbed trailer 104.

The first and second guide tracks 132 and 134, respectively, are configured to support the rolling tarp system 102 by their rolling assemblies (not shown), in a manner similar to a final installation condition of the rolling tarp system 102. The first and second guide tracks 132 and 134, respectively, provide a bearing surface for the front, intermediate, and rear bows 120, 122, and 124, respectively, to freely roll upon in a first direction 150 between the first and second sides 112 and 114, respectively. The first and second guide tracks 132 and 134, respectively, receive the rolling assemblies—e.g., rollers or wheels—of the front, intermediate, and rear bows 120, 122, and 124, respectively, to support the rolling tarp system 102. The first and second guide tracks 132 and 134, respectively, also provide lateral restraint in a second direction 152 between the front and rear portions 110 and 116, respectively, of the flatbed trailer 104. The lateral restraint is against shipping forces and movement.

As illustrated, the first and second guide tracks 132 and 134, respectively, have generally C-shaped cross sections to provide free rolling in the first direction 150 and lateral restraint in the second direction 152. Alternatively, the first and second guide tracks 132 and 134, respectively, may provide free rolling in the first direction 150 and/or lateral restraint in the second direction 152 by other than the illustrated C-shaped cross sections. The first guide track 132 has a first opening or cavity 154 and the second guide track 134 has a second opening or cavity 156. The first and second openings 154 and 156, respectively, are positioned relative to each other to accommodate the rolling tarp systems 102.

As discussed, the first and second guide tracks 132 and 134, respectively, are parallel to each other and extend between the first and second sides 112 and 114, respectively, of the flatbed trailer 104. As such, the rolling tarp systems 102 are loaded and unloaded from either the first or second side 112 or 114, respectively, of the flatbed trailer 104 rather than the rear portion 116. This loading arrangement permits greater flexibility in positioning the rolling tarp systems 102 on the flatbed trailer 104 without undue consideration to the unloading sequence. Thus, the rolling tarp systems 102 do not need to be loaded in reverse of an expected order of delivery in order to efficiently ship and unload the rolling tarp systems 102. Furthermore, changes or errors in the expected order of delivery are readily accommodated by side loading and unloading of the rolling tarp systems 102. A desired rolling tarp system 102 may be unloaded from the first or second side 112 or 114, respectively, regardless of how many other of the rolling tarp systems 102 may be between the desired rolling tarp system 102 and the rear portion 116 of the flatbed trailer 104 that would block access to the desired rolling tarp system 102 from the rear portion 116. The shipping system 100 provides for ease in loading and unloading of the rolling tarp systems 102 by utilizing commonplace equipment, such as a forklift.

In the illustrated embodiment, the first and second track supports 136 and 138, respectively, differ only in positions or locations where the first guide track 132 is attached to the first track supports 136 and the second guide track 134 is attached to the second track supports 138. Thus, discussion of the first track supports 136 applies to the second track supports 138, and vice versa, unless otherwise noted. The first and second guide tracks 132 and 134, respectively, and the first and second track supports 136 and 138, respectively, may be positioned other than as illustrated.

Figure 4:
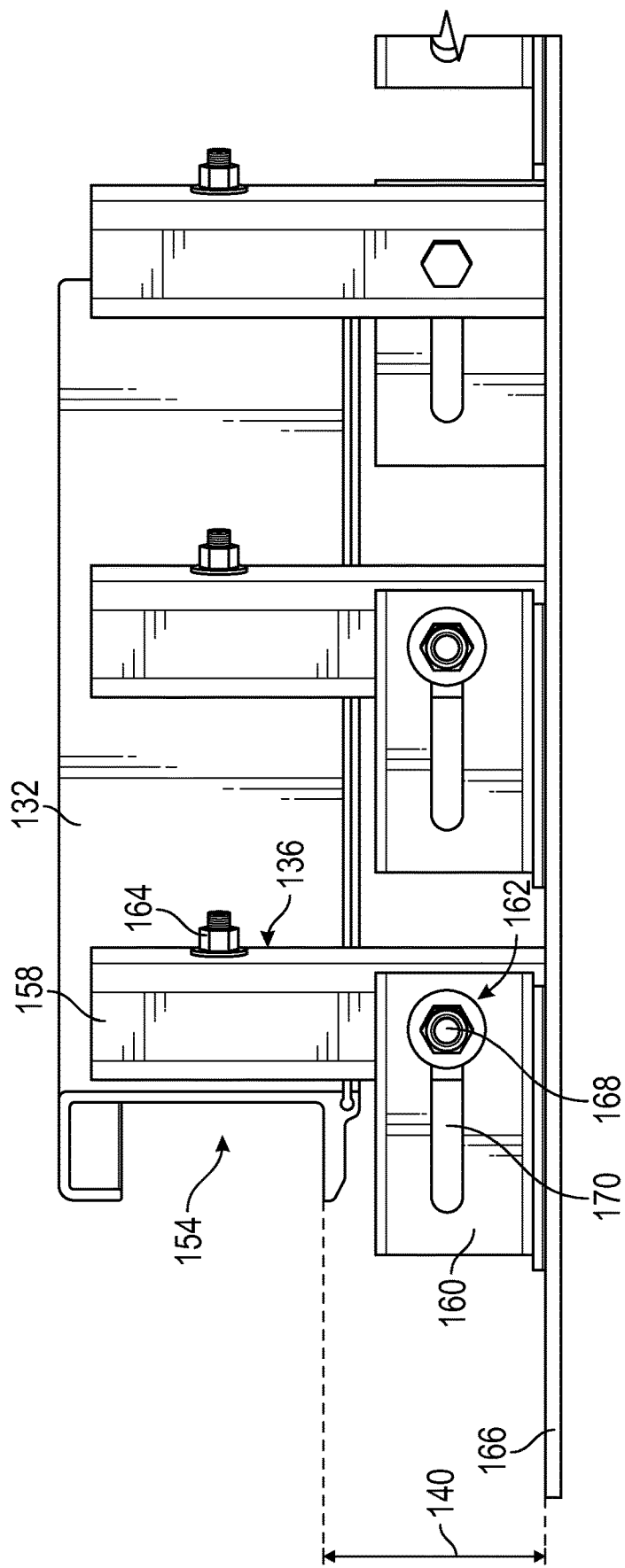
FIG. 4 is a first side elevation view of a portion of the shipping system shown in FIG. 2.

Referring specifically to FIG. 4, each of the first track supports 136 has a post 158, a track bracket 160, and a track connection, indicated generally at 162 (and, as discussed, each of the second track supports also has a post, a track bracket, and a track connection similar to the post 158, the track bracket 160, and the track connection 162, respectively). As illustrated, the track connection 162 is a sliding or otherwise adjustable connection between the post 158 and the track bracket 160. Alternatively, a fixed connection may be substituted for the track connection 162 such that one or both of the first or second guide tracks 132 or 134, respectively, is fixed in position relative to the flatbed trailer 104.

Figure 10:
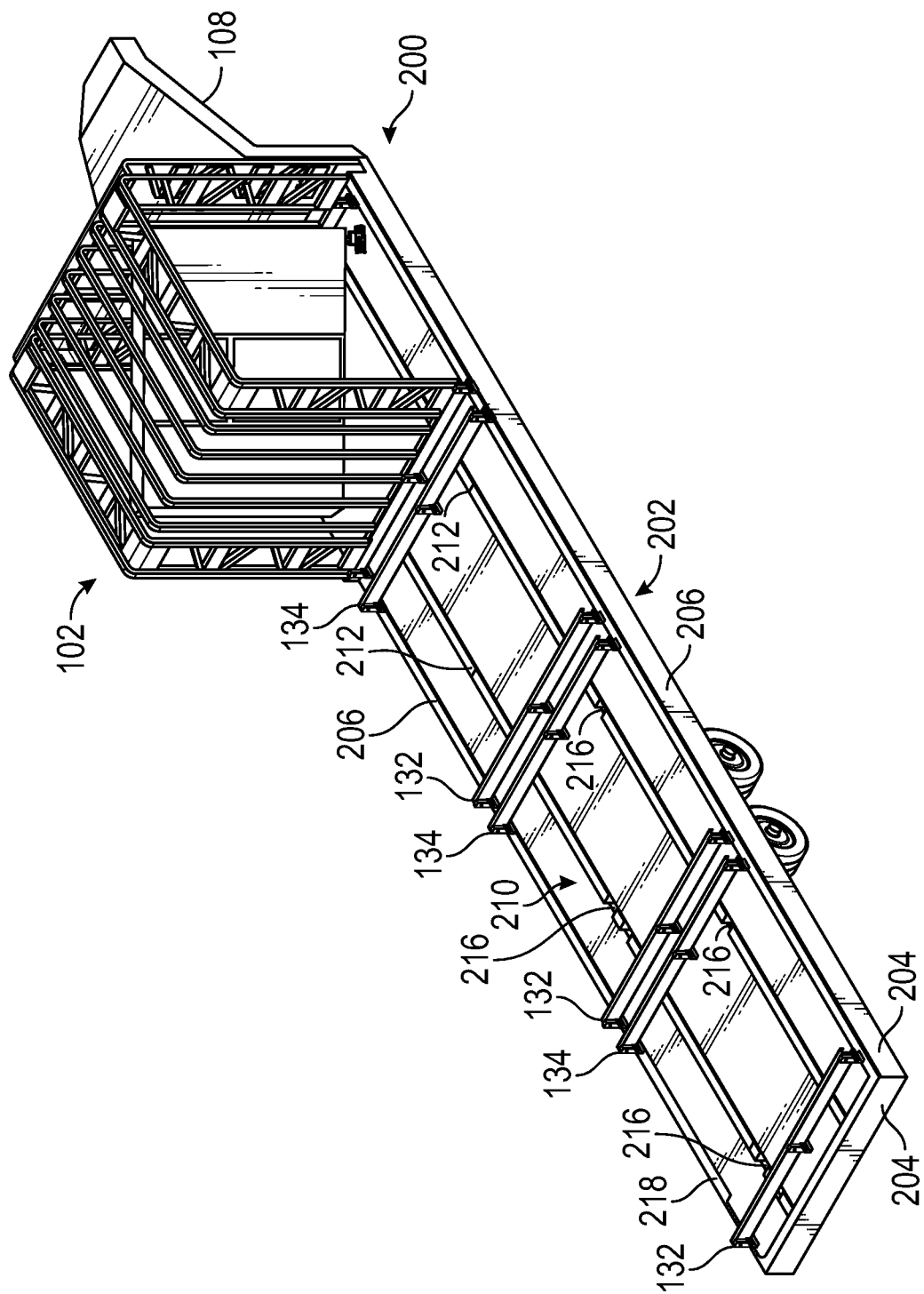
FIG. 10 is a perspective view of the shipping system of FIG. 7 with an exemplary rolling tarp system mounted thereon.
Figure 11:
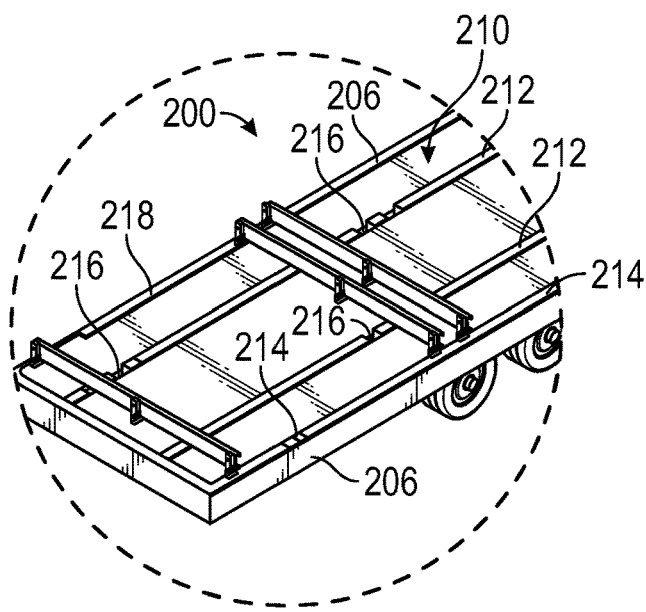
FIG. 11 is an enlarged view of a portion of the shipping system of FIG. 10.

The post 158 is attached to the first guide track 132, such as by a first connection 164. The first connection 164 may be, for example, a moveable connection, such as a bolted connection, or a permanent connection, such as a weldment, adhesive connection, or snap fit connection. Alternatively, the post 158 may otherwise be attached to the first guide track 132 to define and provide the track height 140 of the first guide track 132 above the support surface 118 to accommodate the height of the bulkhead 128. The track height 140 may also provide space between the first and second guide tracks 132 and 134, respectively, and the support surface 118 to transport tracks associated with the rolling tarp system 102, such as support tracks 218 as shown in FIGS. 10 and 11. In one embodiment, the post 158 may include a plurality of holes to accept the first connection 164 to adjustably define the track height 140 and the bow height 126 of the first guide track 132 over the support surface 118. As illustrated, the post 158 is a hollow tube. Alternatively, the post 158 may be, for example, a solid member or an L-shaped angle bracket.

The track bracket 160 is attached to the bed portion 106. As non-limiting examples, the track bracket 160 may be attached to the bed portion 106 by a moveable connection, such as a bolted connection, or a permanent connection, such as a weldment, adhesive connection, or snap fit connection. Attachment of the track bracket 160 to the bed portion 106 by a moveable connection allows adjustment of the first distance 146. As illustrated, the track bracket 160 is an L-shaped bracket. Alternatively, the track bracket 160 may be, for example, a hollow tube section.

As illustrated, the track bracket 160 is attached to the bed portion 106. Alternatively, the track bracket 160 may be attached to an intermediate bottom member 166 (shown in FIGS. 3-6) that is in turn attached to the bed portion 106. In one embodiment, such an intermediate bottom member 166 may facilitate assembly of the shipping system 100 prior to loading on the flatbed trailer 104 to form a pallet.

The track connection 162 has a second connection 168 attaching the post 158 to the track bracket 160. As illustrated, the second connection 168 is a bolt extending through a slot 170 in the track bracket 160. A position of the post 158 may be adjusted relative to the track bracket 160 along a length of the slot 170. Alternatively, the second connection 168 may be other than as illustrated. As non-limiting examples, the second connection 168 may be a permanent connection, such as a weldment, adhesive connection, or snap fit connection. In one embodiment, the track bracket 160 may include a plurality of holes to accept the second connection 168 to adjustably define the first distance 146.

In the illustrated embodiment, the post 158 supports the first guide track 132 above the track bracket 160 such that the post 158 is the defining element for both the track height 140 and the bow height 126 above the support surface 118. Alternatively, the track bracket 160 may directly support the first guide track 132—i.e., the first guide track 132 may directly contact the track bracket 160—such that the track bracket 160 defines both the track height 140 and the bow height 126 above the support surface 118.

As discussed, the first distance 146 may be adjusted via the track connections 162 of the first and second track supports 136 and 138, respectively. As a non-limiting example, each of the track connections 162 may be adjusted by at least 3 inches such that the first distance 146 is adjustable between 96 inches and 102 inches to fit different sizes of the rolling tarp systems 102 (illustrated in FIG. 1). As illustrated, the first distance 146 is adjustable in the second direction 152 along the trailer length between the front portion 110 and the rear portion 116. Rolling tarp systems 102 of various widths 171 (shown in FIG. 1) can be accommodated by the adjustability of the first distance 146 between the first and second guide tracks 132 and 134, respectively.

The first and second receivers 142 and 144, respectively, support the bulkhead 128 in the shipping system 100. The first and second receivers 142 and 144, respectively, also restrain the bulkhead 128 from movement in a plane defined by the support surface 118—i.e., the bulkhead 128 is restrained from typically horizontal movement on the bed portion 106. The first and second receivers 142 and 144, respectively, are attached along an axis 172. The axis 172 is at an angle 174 relative to the first and second guide tracks 132 and 134, respectively, however, other relative orientations or positions may be used in order to support the bulkhead 128. The first and second receivers 142 and 144, respectively, are symmetric—i.e., the first and second receivers 142 and 144, respectively, are mirror images of each other. Thus, discussion of the first receiver 142 applies to the second receiver 144 unless otherwise noted.

Figure 5:
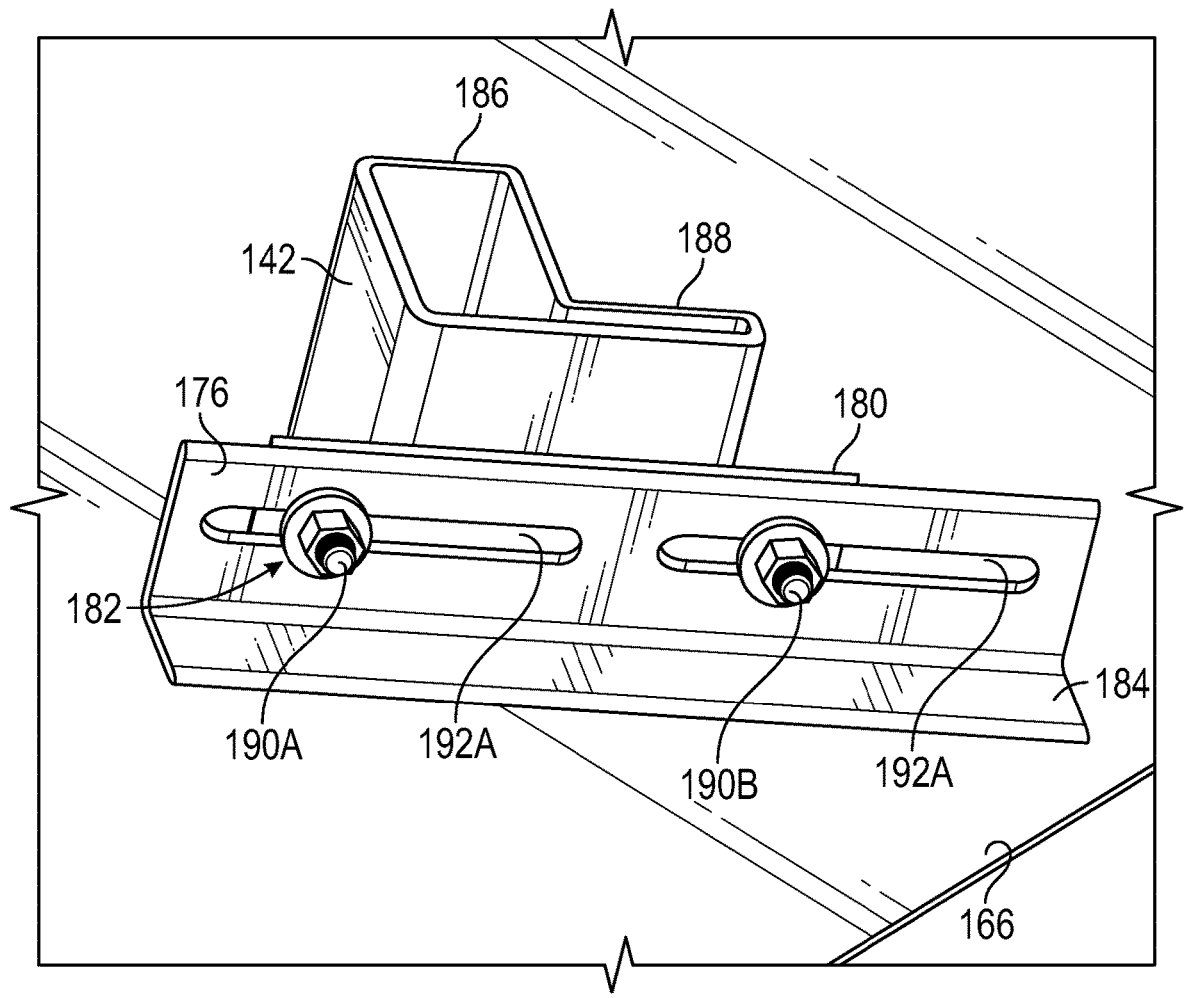
FIG. 5 is a second enlarged perspective view of a portion of the shipping system shown in FIG. 2.
Figure 6:
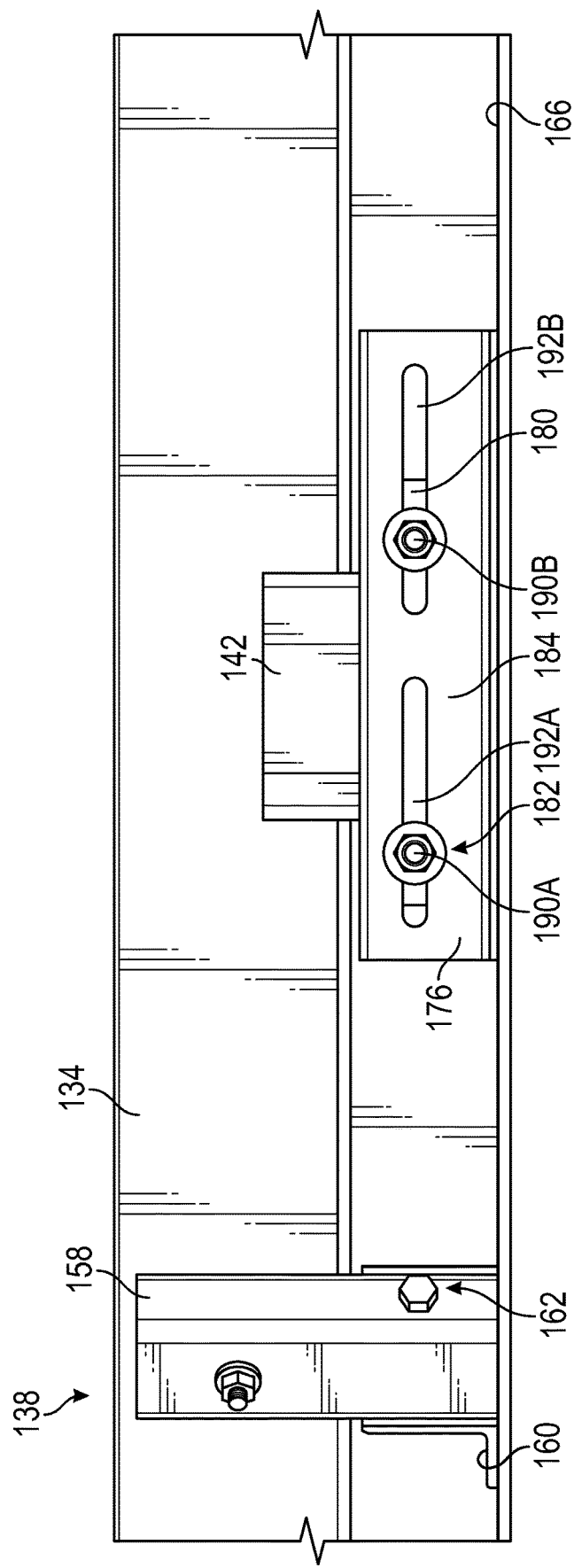
FIG. 6 is a second side elevation view of a portion of the shipping system shown in FIG. 2.

Referring specifically to FIGS. 5 and 6, the first receiver 142 is supported on a first receiver support 176. Similarly, the second receiver 144 is supported on a second receiver support 178. Discussion of the first receiver support 176 applies to the second receiver support 178, unless otherwise stated.

The first receiver 142 has a plate 180 attached to the first receiver support 176. The plate 180 may be permanently fixed to the first receiver 142, removably attached to the first receiver 142, or omitted. In turn, the plate 180 (or alternatively the first receiver 142 when the plate 180 is omitted) is attached by a receiver connection, indicated generally at 182, to a receiver bracket 184. The receiver bracket 184, illustrated as an L-bracket, is attached to the flatbed trailer bed 104. Alternatively, the receiver bracket 184 may be attached to the intermediate bottom member 166.

As discussed, the first receiver 142 is supported by the first receiver support 176 and the second receiver 144 is supported by the second receiver support 178, both on the support surface 118, to interface with the bulkhead 128. In certain embodiments, the first and second receivers 142 and 144, respectively, may both locate the bulkhead 128 and also bear the bulkhead weight, the bulkhead weight then being transferred onto the bed portion 106 through the first and second receivers 142 and 144, respectively. Alternatively, the first and second receivers 142 and 144, respectively, may be configured such that movement of the bulkhead 128 is restrained by the first and second receivers 142 and 144, respectively, but the weight of the bulkhead 128 bears on the bed portion 106 other than through the first and second receivers 142 and 144, respectively. As a non-limiting example, the bulkhead weight may bear on the bed portion 106 through blocking or other intermediary members between the bulkhead 128 and the bed portion 106 (and not through the first and second receivers 142 and 144, respectively).

The first receiver 142 has a body portion 186 and a leg portion 188 extending from the body portion 186 such that the first receiver 142 has a generally elongated L-shape. As illustrated, the leg portions 188 of the first and second receivers 142 and 144, respectively, extend away from each other when installed on the bed portion 106. Alternatively, the first or second receivers 142 or 144, respectively, may have a shape other than illustrated—i.e., other than the elongated L-shape. For example, the leg portion 188 may be omitted or the first or second receiver 142 or 144, respectively, may be an L-shaped angle bracket. The shape of the first receiver 142 is coordinated to fit a protruding portion or member of the bulkhead 128. Alternatively, a single receiver may be provided to support the bulkhead 128. The plate 180 is shown attached to both the body portion 186 and the leg portion 188 of the first receiver 142. In one embodiment, the plate 180 is welded to the first receiver 142. Alternatively, the plate 180 may be otherwise attached to the first receiver 142, such as for example, by screwing or bolting.

The plate 180 is also attached to the receiver bracket 184 by the receiver connection 182. As illustrated, the receiver connection 182 has a first bolt 190A in a first slot 192A and a second bolt 190B in a second slot 192B. The first bolt 190A extends through the first slot 192A and the second bolt 190B extends through the second slot 192B such that a position of the first receiver 142 may be adjusted relative to the receiver bracket 184 along lengths of the first and second slots 192A and 192B, respectively—i.e., the receiver connection 182 is illustrated as a sliding connection. Alternatively, the receiver connection 182 may have more or less than the two bolts and the two slots illustrated. Alternatively, the receiver connection 182 may be a permanent connection, such as a weldment, adhesive connection, or snap fit connection.

The receiver bracket 184 is attached to the bed portion 106. As non-limiting examples, the receiver bracket 184 may be attached to the bed portion 106 by a moveable connection, such as a bolted connection, or a permanent connection, such as a weldment, adhesive connection, or snap fit connection. Alternatively, the receiver bracket 184 may be attached to the intermediate bottom member 166.

The second distance 148 may be adjusted via the receiver connections 182 of the first and second receivers 142 and 144, respectively. As a non-limiting example, the second distance 148 may be adjusted by 5 inches at each of the first and second receivers 142 and 144, respectively, for a total adjustment of 10 inches to fit different sizes of the bulkhead 128.

Because the first and second guide tracks 132 and 134, respectively, are elevated above the support surface 118 of the flatbed trailer 104, a space defined by the upright front, intermediate, and rear bows 120, 122 and 124, respectively, in the compressed state and indicated generally at 193, is sufficiently tall enough to permit the bulkhead 128 to be positioned therein. The first and second receivers 142 and 144, respectively, locate and support the bulkhead 128 within the space 193 defined by the front, intermediate, and rear bows 120, 122, and 124, respectively in the compressed state. Furthermore, the angular orientation of the bulkhead 128 within the space 193 (as defined by the angle 174) permits a width 194 (shown in FIG. 1) of the bulkhead 128 to be accommodated between the first and second guide tracks 132 and 134, respectively. In addition, when the tarp section is supported by the front, intermediate, and rear bows 120, 122, and 124, respectively, in the deployed state, the tarp section provides protection of the bulkhead 128, the front, intermediate, and rear bows 120, 122, and 124, respectively, and additional components located on the flatbed trailer 104 during transport.

As illustrated, each of the first, second, third, and fourth loading bays 130A, 130B, 130C, and 130D, respectively, accommodates a single rolling tarp system 102. However, as space allows, more than one of the rolling tarp systems 102 of the same width 171—i.e., being accommodated by the same first distance 146—may be loaded into one of the first, second, third, or fourth loading bays 130A, 130B, 130C, or 130D, respectively. By loading more than one of the rolling tarp systems 16 into the first, second, third, or fourth loading bays 130A, 130B, 130C, or 130D, respectively, a shipping capacity of the flatbed trailer 104 may be increased and/or maximized. In addition, rolling tarp systems 102 having different widths may be shipped on the same flatbed trailer 104 (in different loading bays).

Referring now to FIGS. 7-11, there is illustrated another embodiment of a shipping system, shown generally at 200. The shipping system 200 is shown as part of a transport system in the form of a flatbed trailer 202. The flatbed trailer 202 includes a frame, indicated generally at 204, having side rails 206 that define, in part, an outer trailer bed perimeter, indicated generally at 208, of a bed portion 210 of the flatbed trailer 202. The bed portion 210 comprises inner rails 212 that are illustrated as positioned within the trailer bed perimeter 208 and extending longitudinally in the second direction 152. Alternatively, the inner rails 212 may extend transversely from side to side in the first direction 150 or in a diagonal orientation.

The side rails 206 include a plurality of side rail pockets 214 that are configured to accept the posts 158 of the first and second track supports 136 and 138, respectively, to locate and secure the first and second guide tracks 132 and 134, respectively, relative to the flatbed trailer 202. Alternatively, the side rail pockets 214 may accept portions of the posts 158 that extend below a stop, that is similar to the track bracket 160. The stop engages the bed portion 210 when the posts 158 enter the side rail pockets 214—i.e., the stop prevents further entry of the posts 158 into the side rail pockets 214. The side rail pockets 214 are formed as openings in the side rails 206.

The inner rails 212 include a plurality of bulkhead pockets 216 that are configured to accept supporting structures, such as the first and second receivers 142 and 144, respectively, that support and secure a bulkhead, such as the bulkhead 128, against shipping forces and movement. The bulkhead pockets 216 may be either formed as openings in the inner rails 212 or define spaces or breaks between sections of the inner rails 212 that together span the particular orientation (longitudinal or transverse) relative to the side rails 206.

Figure 2:
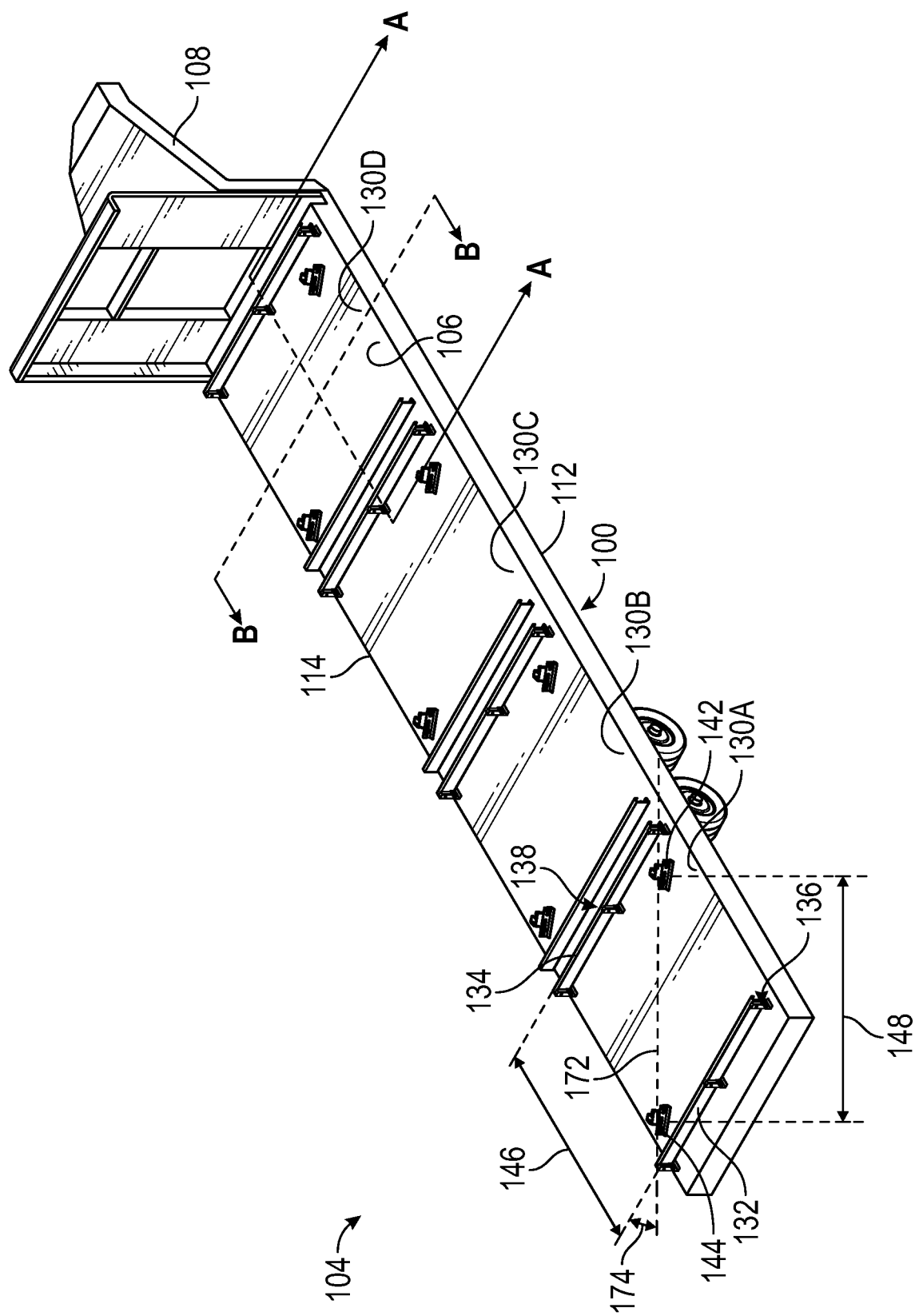
FIG. 2 is a perspective view of a transport system for use with the shipping system of FIG. 1.
Figure 3:
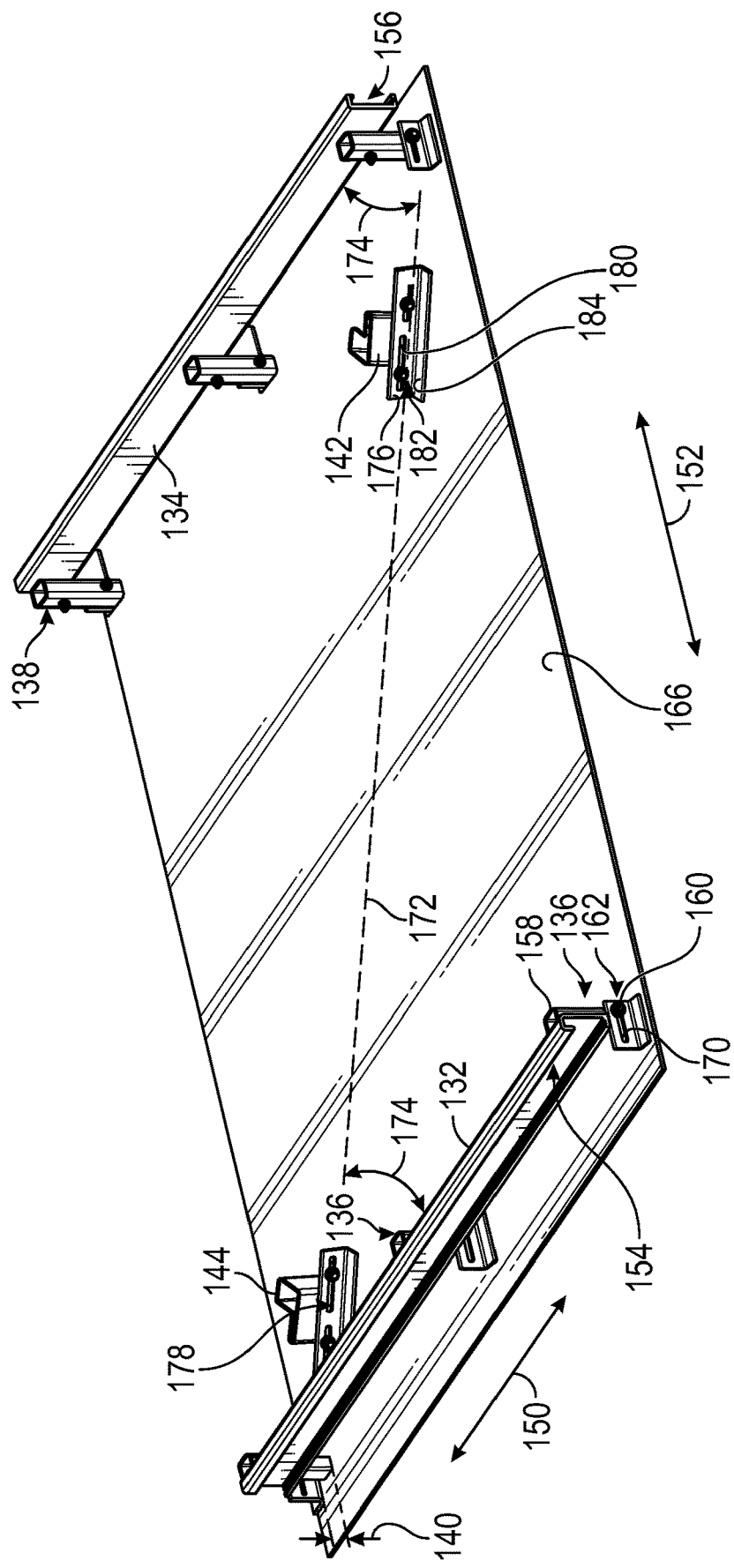
FIG. 3 is a first enlarged perspective view of a portion of the shipping system shown in FIG. 2.
Figure 7:
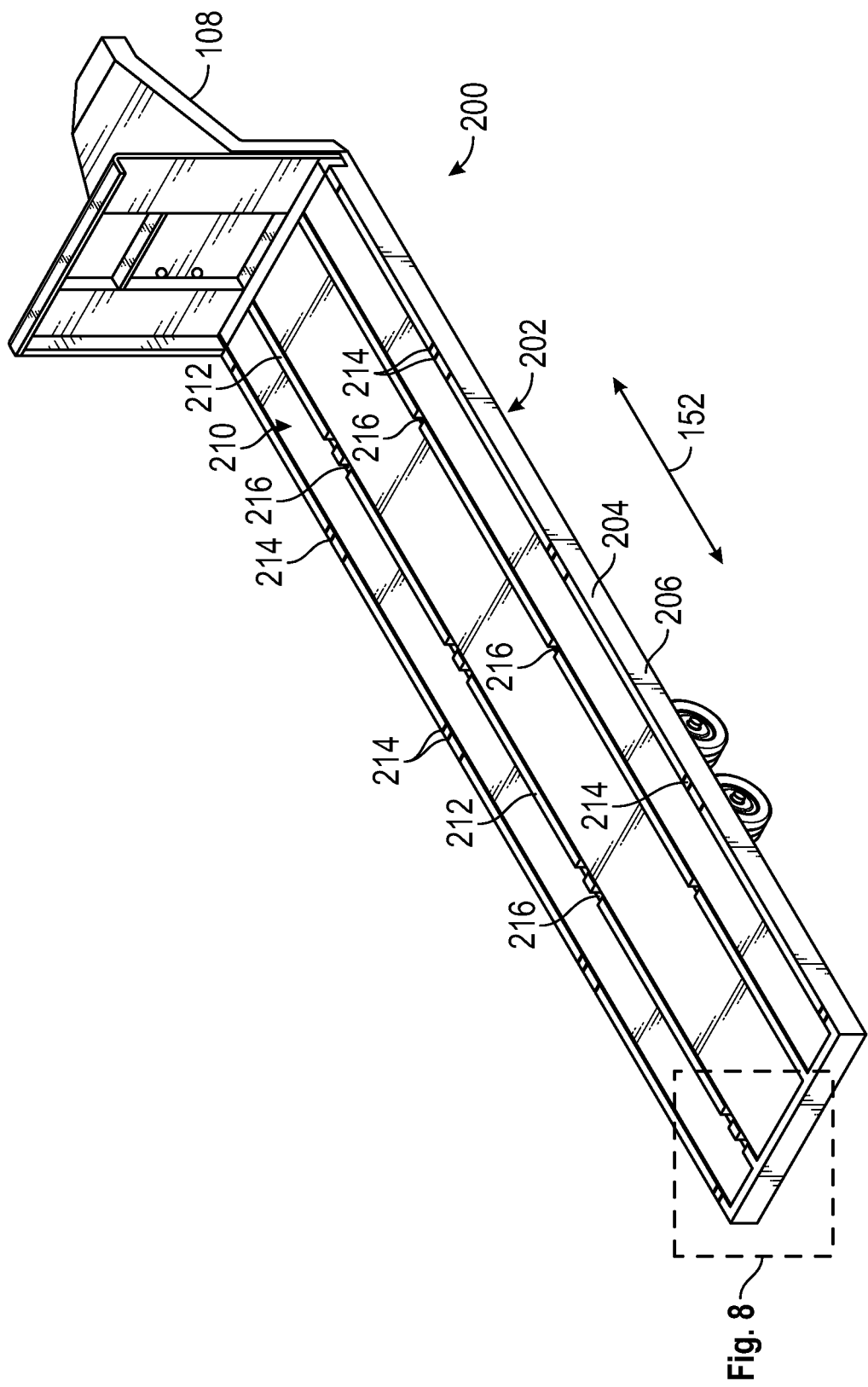
FIG. 7 is a perspective view of another embodiment of a shipping system for rolling tarp systems in accordance with the invention.
Figure 8:
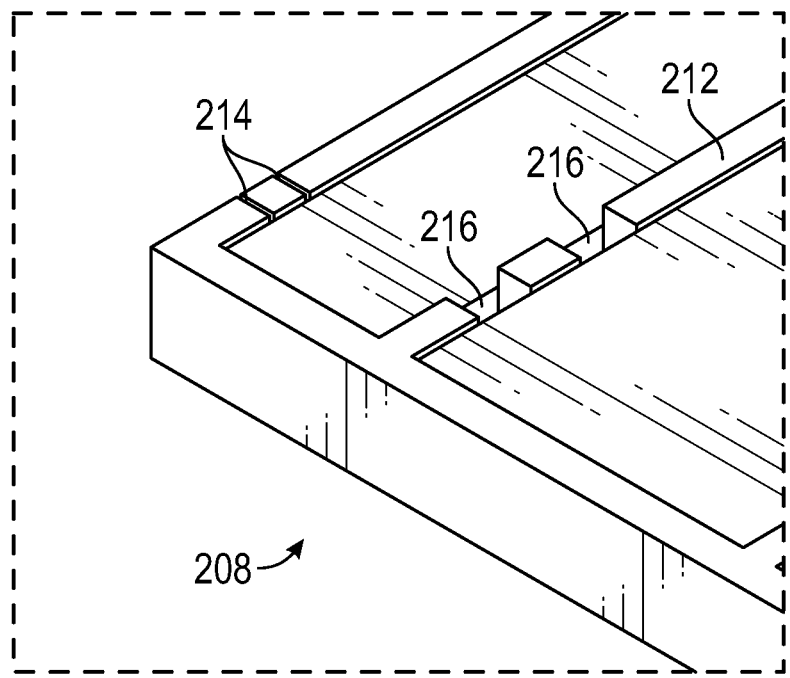
FIG. 8 is an enlarged portion of the shipping system of FIG. 7.
Figure 9:
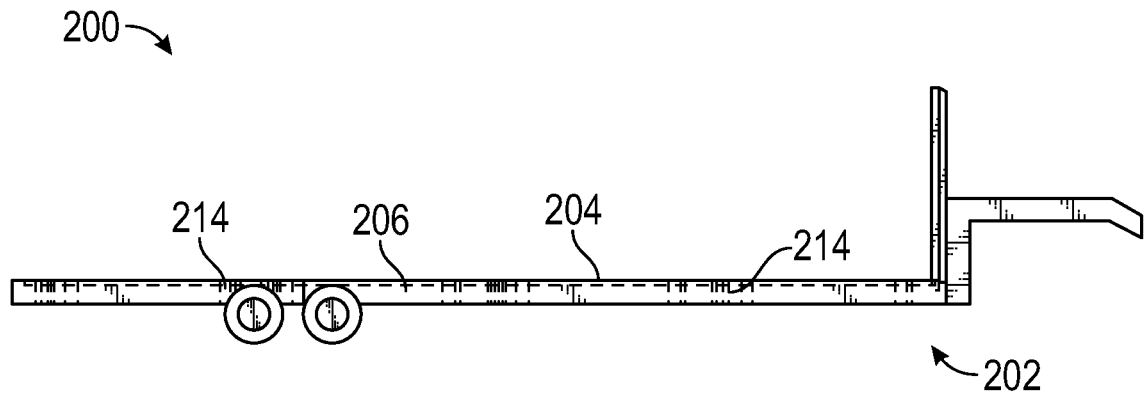
FIG. 9 is a side view of the shipping system of FIG. 7.

In one embodiment, the side rail pockets 214 are formed in sets to provide a variable distance to accommodate rolling tarp systems of different widths, such as between widths of about 96 inches to about 102 inches. As shown in FIGS. 7, 10 and 11, placement of the side rail pockets 214 permits the first and second guide tracks 132 and 134, respectively, to be spaced closer together or further apart and adjust the first distance 146, as shown in FIG. 2. The bulkhead pockets 216 may be formed in sets to provide a variable distance, such as the second distance 148, to accommodate bulkheads 128 of different widths 194. As can be seen in FIGS. 10 and 11, the shipping system 200 provides a similar spaced relationship of the first and second track guides 132 and 134, respectively, above the surface of the flatbed trailer 202 to accommodate shipping of the support tracks 218 associated with the rolling tarp system 102.

Referring now to FIGS. 12-16C, there is illustrated another embodiment of a shipping system, shown generally at 300. The shipping system 200 is shown as part of a transport system in the form of a flatbed trailer 302, similar to the flatbed trailer 202 of FIG. 7, though other transport structures may be used and remain within the scope of the invention.

The flatbed trailer 302 includes side rails 304 and support tracks 306 as well as a rear portion, indicated generally at 308. Each of the side rails 304 and each of the support tracks 306 are on opposite sides of the flatbed trailer 302. The support tracks 218 are configured to receive rollers or wheels of an outer rolling tarp system, indicated generally at 310 (illustrated without a tarp section). The outer rolling tarp system 310 is separate and distinct from any rolling tarp systems 102 being shipped using the shipping system 300. The outer rolling tarp system 310 may be deployed over the shipped rolling tarp systems 102 to cover and protect the shipped rolling tarp systems 102 during shipping.

The shipping system 200 further includes first and second anchoring rails 312A and 312B, respectively. As illustrated, the first and second anchoring rails 312A and 312B, respectively, are spaced equally across a support surface 316 of the flatbed trailer 302. Alternatively, the first and second anchoring rails 312A and 312B, respectively, may be spaced other than as illustrated or more or less than the first and second anchoring rails 312A and 312B, respectively, may be provided for the shipping system 200. The first and second anchoring rails 312A and 312B, respectively, will be discussed further below.

A plurality of side rail pockets 314 are located between the side rails 304 and the support tracks 306. The side rail pockets 314 are similar to the side rail pockets 214 and are configured to accept the posts 158 of the first and second track supports 136 and 138, respectively, to locate and secure the first and second guide tracks 132 and 134, respectively, to the flatbed trailer 302. Alternatively, the side rail pockets 314 may accept portions of the posts 158 that extend below a stop, similar to the track bracket 160. As illustrated, the side rail pockets 314 are formed from U-shaped members fixed to the side rails 304. Alternatively, the side rail pockets 314 may be formed other than as illustrated. As a non-limiting example, the side rail pockets 314 may be formed from tubular members fixed to the side rails 304.

The side rail pockets 314 are formed in sets to provide a variable distance to accommodate the rolling tarp systems 102 of different widths, such as between widths of about 96 inches to about 102 inches. As shown in FIG. 11, placement of the side rail pockets 314 permit the first and second guide tracks 132 and 134, respectively, to be spaced closer together or further apart by the first distance 146, as shown in FIG. 2.

Figure 12:
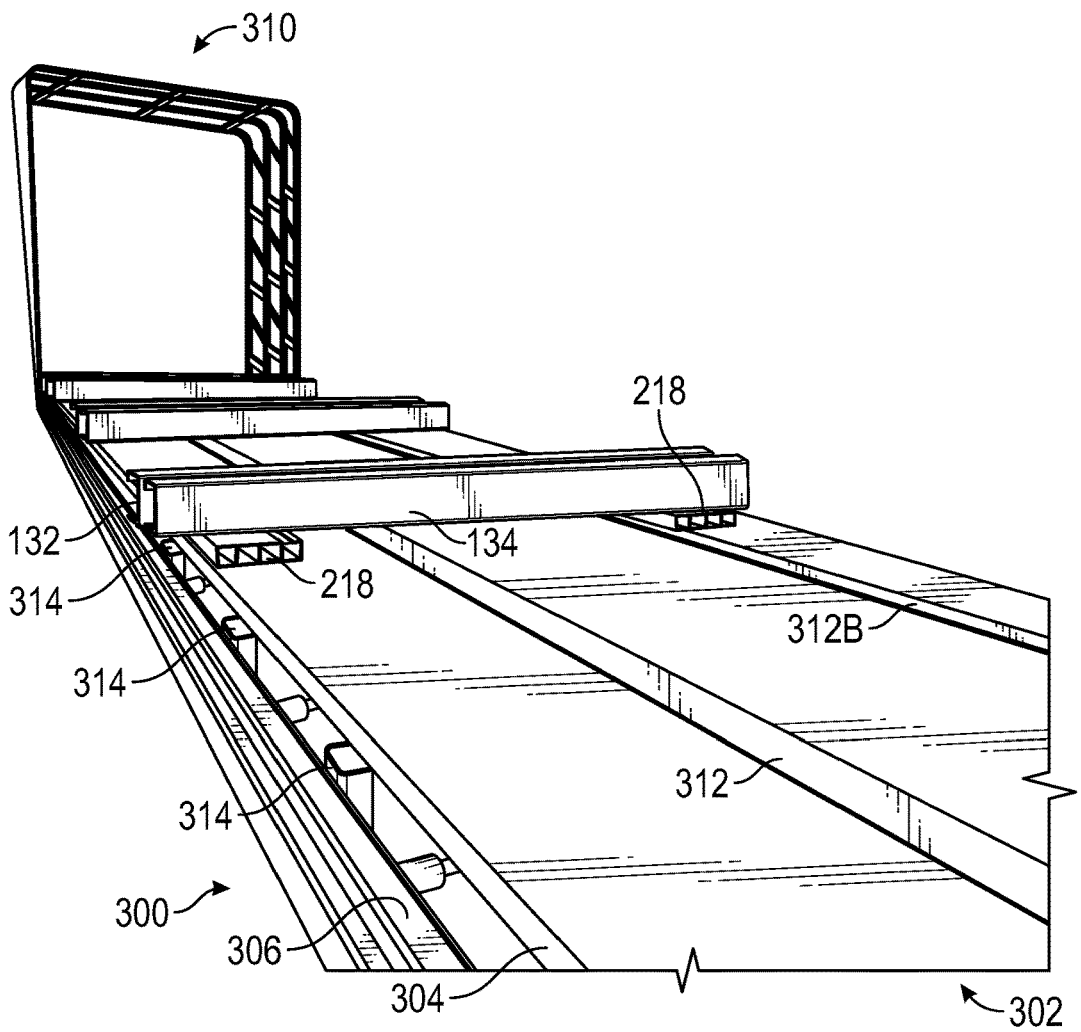
FIG. 12 is a partial perspective view of another embodiment of a shipping system for rolling tarp systems in accordance with the invention.
Figure 14:
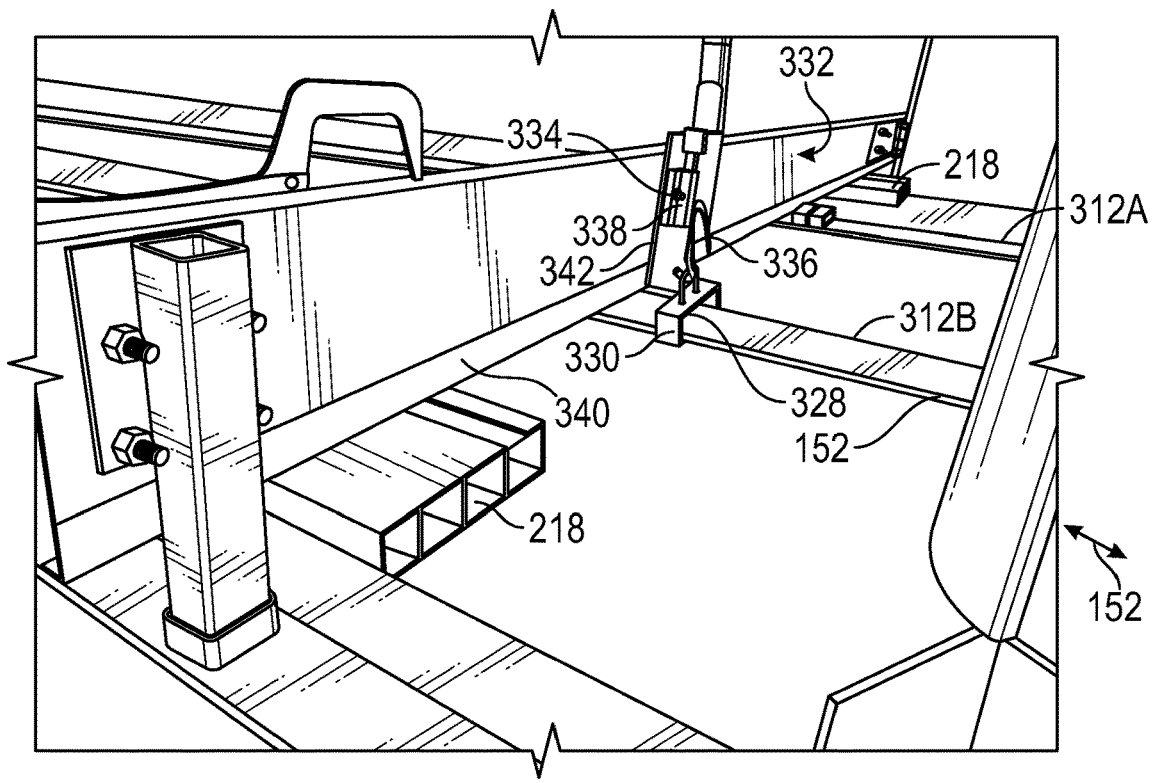
FIG. 14 is a second enlarged perspective view of a portion of the shipping system shown in FIG. 12.

FIGS. 12 and 14 show the track height 140 providing space to transport tracks associated with the rolling tarp system 102, such as support tracks 218.

Figure 13:
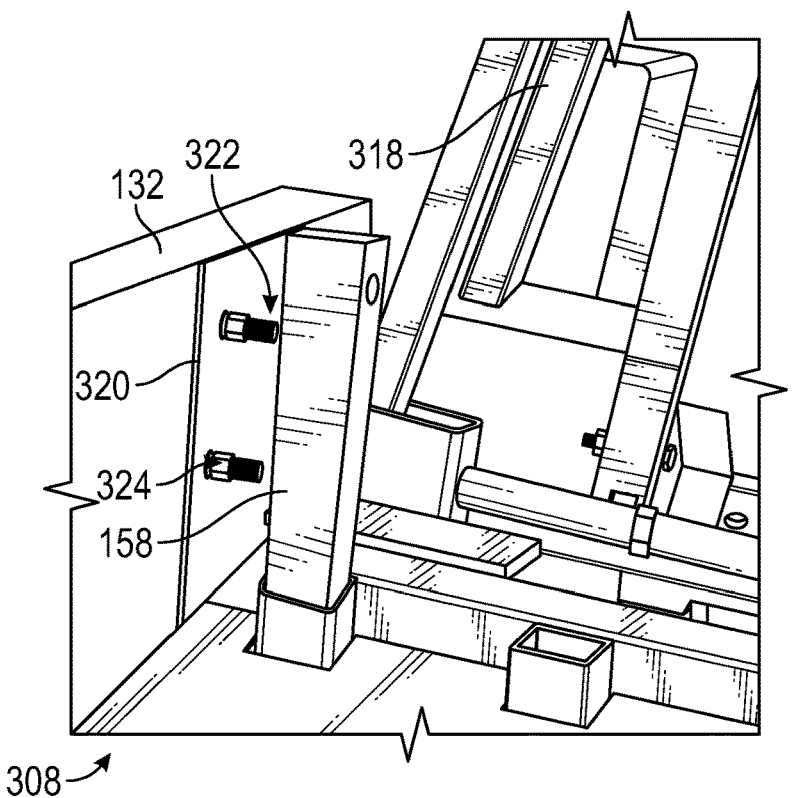
FIG. 13 is a first enlarged perspective view of a portion of the shipping system shown in FIG. 12.

Referring specifically to FIG. 13, the side rail pockets 314 at the rear portion 308 are positioned inboard of the side rails 304. This provides clearance for a tarp tensioning device 318 (shown in FIG. 14) that may be provided to tension the outer rolling tarp system 310. When provided, the tarp tensioning device 318 typically occupies space between the side rail 304 and the support track 306 with one of the tarp tensioning devices 318 provided on each side of the flatbed trailer 302.

Also shown in FIG. 13 is an attachment plate 320 between the posts 158 and the first guide track 132. The attachment plate 320 may also be provided between the posts 158 and the second guide tracks 134. The attachment plate 320 is fixed to the post 158 by a first connection, indicated generally at 322, and the first guide track 132 is fixed to the attachment plate 320 by a second connection, indicated generally at 324. As illustrated, the first connection 322 is a weldment and the second connection 324 is a bolted connection. Alternatively, the first and/or second connections 322 and/or 324, respectively, may be other than as illustrated. As non-limiting examples, either of the first or second connections 322 or 324, respectively, may be, for example, a moveable connection, such as a bolted connection, or a permanent connection, such as a weldment, adhesive connection, or snap fit connection. Alternatively, other suitable connections may be provided between the attachment plate 320, the post 158, and the first guide track 132. As a non-limiting example, adjustable connections may be provided that allow for adjustment of a track height 140 between the support surface 316 and the first guide track 132.

Referring specifically to FIG. 14, the first and second anchoring rails 312A and 312B, respectively, are shown in detail. The first and second anchoring rails 312A and 312B, respectively, are depicted as rails having a generally "T" or "I" shaped section. An upper flange 326 on each longitudinal side of each of the first and second anchoring rails 312A and 312B, respectively, extends longitudinally along the length and above the support surface 316 of the flatbed trailer 302 in the second direction 152.

The upper flange 326 permits an anchor attachment 328, such as an illustrated "C" shaped anchor, to extend under either one flange lip or both flange lips on either side of the first and second anchoring rails 312A and 312B, respectively. The flange lips generally permit an "infinite" length adjustment along the flatbed trailer 302 since there are not detents or other stops spaced along the length. Thus, the anchor attachment 328 may be "infinitely" adjusted along a length of the first and second anchoring rails 312A and 312B, respectively. In an alternative embodiment, the flange lips may include extending teeth, cutouts, detents or other stops along the rail length on one or both sides that provide discrete attachment points along the length of the first and second anchoring rails 312A and 312B, respectively. The anchor attachment 328 includes an anchor ring 330.

FIG. 14 also shows a track tensioning device, indicated generally at 332. The track tensioning device 332 is fixed to the first or second guide tracks 132 or 134, respectively, by a tensioning connection 334. As illustrated, the tensioning connection 334 is a bolted connection, although other suitable connections means may be used. As non-limiting examples, the tensioning connection 334 may be a permanent connection, such as a weldment, adhesive connection, or snap fit connection. The track tensioning device 332 further has a first portion 336 that bears on the anchor attachment 328 and a second portion 338 that is secured to the anchor ring 330. In operation, the first portion 336 presses downward on the anchor attachment 328 such that a resulting reaction pushes the first or second guide track 132 or 134, respectively, upward. At the same time, the second portion 338 limits an upward displacement of the first or second guide track 132 or 134, respectively, caused by the resulting reaction from the first portion 336. As a result, the posts 158 are vertically restrained in the side pockets 314.

In addition to the tensioning connection 334, the first or second guide track 132 or 134, respectively, may be provided with a track step or ledge 340. The track, tensioning device 332 is provided with a corresponding device step or ledge 342 that fits or otherwise corresponds with the track step 340. When the reaction force of the track tensioning device 332 pushes the first or second guide track 132 or 134, respectively, upward, the reaction force is applied both through the tensioning connection 334 and by the corresponding device step 342 pressing upward on the track step 340.

Figure 15:
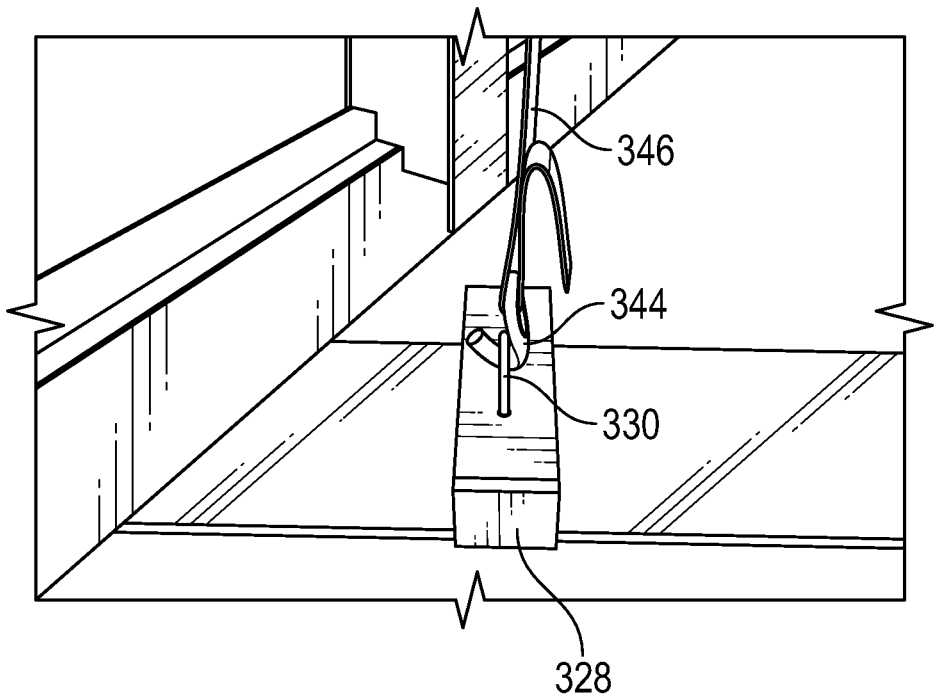
FIG. 15 is a third enlarged perspective view of a portion of the shipping system shown in FIG. 12.

Referring specifically to FIG. 15, a first strap end 344 of a strap 346 may be attached to the anchor ring 330. As illustrated, the first strap end 344 has a hook that interfaces with the anchor ring 330. The strap 346 may then secure the bulkhead 128 by a suitable means and be tensioned to secure the bulkhead 128 in place in the shipping system 300. As a non-limiting example, the strap 346 may be secured to the bulkhead 128 by attaching the strap 346 to an anchor ring on the bulkhead 128. As a further non-limiting example, the strap 346 may be secured to the bulkhead 128 by wrapping the strap 346 around or over the bulkhead 128 and then securing a second strap end (not shown) of the strap 346 to a second anchor attachment (not shown), the second anchor attachment being secured to one of the first or second anchoring rails 312A or 312B, respectively.

Figure 16A:
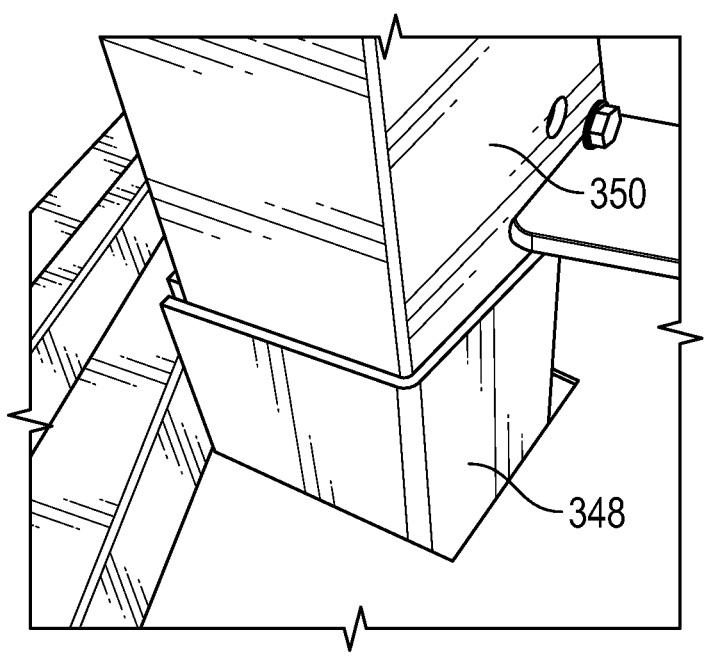
FIGS. 16A-16C are additional enlarged perspective views of a portion of the shipping system shown in FIG. 12.
Figure 16B:
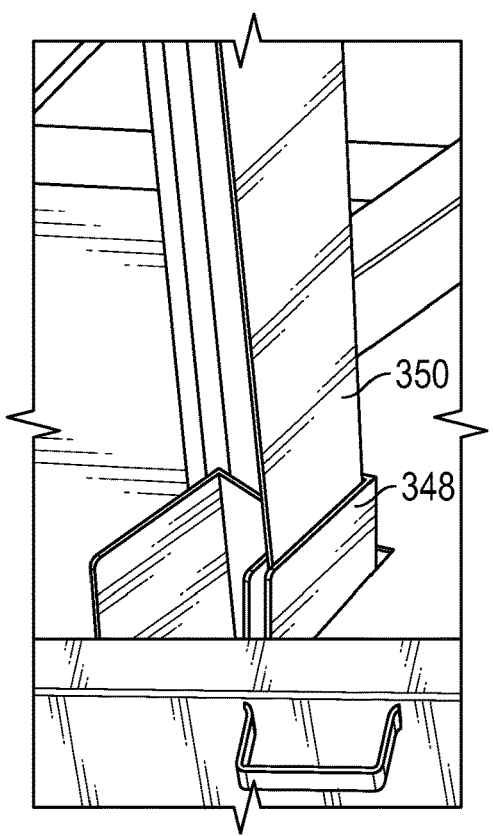
Figure 16C:
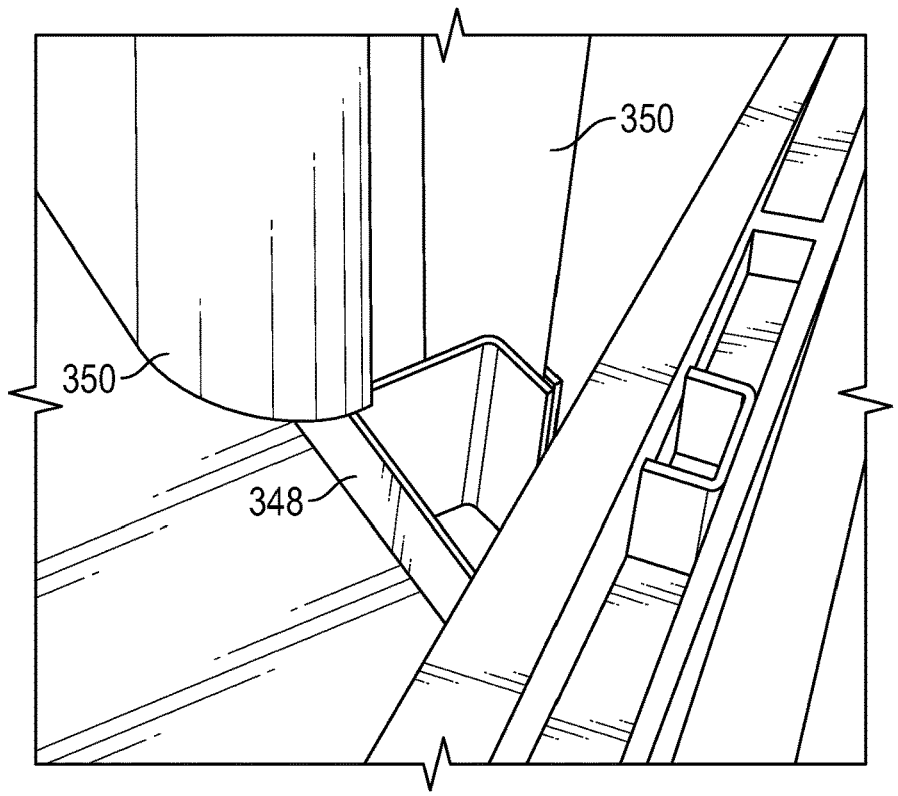

Referring specifically to FIGS. 16A-16C, there is illustrated a bulkhead receiver 348. The bulkhead receiver 348 is similar to the first or second receivers 142 or 144, respectively, but has a non-elongated L-shape. As a non-limiting example, the bulkhead receiver 348 may be formed from two L-shaped angle brackets spaced apart to accommodate a protruding portion or member 350 of the bulkhead 128. The bulkhead receiver 348 corresponds to the protruding portion 350 of the bulkhead 128 such that the protruding portion 350 fits within the bulkhead receiver 348 and is laterally restrained against shipping forces and movement. The bulkhead receiver 348 may be fixed to the flatbed trailer 302 by, for example, a moveable connection, such as a bolted connection, or a permanent connection, such as a weldment, adhesive connection, or snap fit connection.

Words used herein to describe the relative orientation of components, such as upper, lower, left, right, vertical, horizontal, inner, outer, front, rear, and the like are intended to assist the reader in interpreting the drawings and structures relative to how they are illustrated and conventionally observed. Such descriptions are not limited to an absolute coordinate system, unless specifically defined herein, and are merely descriptive aids to describe and define the embodiments disclosed herein.

The principle and mode of operation of this invention have been explained and illustrated in its preferred embodiments. However, it must be understood that this invention may be practiced otherwise than as specifically explained and illustrated without departing from its spirit or scope. It is further understood that any particular element of one embodiment may be applied in combination with other embodiments and remain within the scope of the invention.

What is claimed is:

1. A shipping system for a rolling tarp system, the shipping system comprising:

a trailer having a towing element defining a front portion, the trailer having first and second sides that define a longitudinal axis and a plurality of receivers attached to the trailer that are configured to locate a bulkhead and define a first height for the bulkhead above the support surface; and first and second guide tracks attached to the trailer and configured to support the rolling tarp system, wherein the first and second guide tracks extend between the first side and the second side and define a loading bay, the first and second guide tracks being configured to accept and retain the rolling tarp system on the trailer, wherein the first and second guide tracks are configured to support the rolling tarp system in an upright, compressed state and define a second height for the rolling tarp system above the support surface, and the second height is greater than the first height such that a space defined by the rolling tarp system accommodates the first height of the bulkhead.

2. The shipping system of claim 1 wherein the plurality of receivers is positioned between the first and second guide tracks at a relative angular alignment.

3. The shipping system of claim 2 wherein the plurality of receivers is a pair of spaced apart receivers that are adjustable to vary an axial distance therebetween.

4. The shipping system of claim 1 wherein the plurality of receivers is first and second receivers and the shipping system further comprises:
a first receiver bracket connected to the trailer and having a first receiver sliding connection between the first receiver and the first receiver bracket; and
a second receiver bracket connected to the trailer and having a second receiver sliding connection between the second receiver and the second receiver bracket, wherein the first and second receiver sliding connections adjust an axial distance between the first and second receivers.

5. The shipping system of claim 1 wherein the first and second guide tracks are adjustable relative to the support surface to vary a width spacing therebetween.

6. The shipping system of claim 5 further comprising:
a plurality of track supports connecting the first and second guide tracks to the trailer, wherein each of the plurality of track supports includes
a post connecting to the first or second guide track and
a track bracket configured to permit adjustment of the width spacing between the first and second guide tracks.

7. The shipping system of claim 1 wherein the trailer is a flatbed trailer.

8. The shipping system of claim 1 wherein the trailer is part of a stake truck.

9. A shipping system for a rolling tarp system, the shipping system comprising:
a trailer having
a towing element, wherein the towing element defines, for the trailer, a front portion at the towing element, a rear portion opposite the front portion, and opposing first and second side portions between the front portion and the rear portion,
a frame including side rails that define a perimeter of the trailer and have side rail pockets, and
a support surface including at least one inner rail having at least one bulkhead pocket; and
first and second guide tracks secured in the side rail pockets and configured to support the rolling tarp system, wherein the first and second guide tracks span between the first and second side portions and are configured to accept and retain the rolling tarp system.

10. The shipping system of claim 9 wherein the at least one bulkhead pocket is configured to accept a supporting structure to secure a bulkhead to the trailer.

11. The shipping system of claim 10 wherein the first and second guide tracks are configured to locate the rolling tarp system at a first height above the support surface and support the rolling tarp system to define a space, the supporting structure is configured to locate the bulkhead at a second height above the support surface, and the first height is greater than the second height such that the space is configured to accommodate the second height of the bulkhead.

12. The shipping system of claim 9 wherein the side rail pockets are formed in sets to permit the first and second guide tracks to be spaced closer together or further apart by a first distance.

13. The shipping system of claim 12 wherein the first distance defines a rolling tarp system width of about 96 inches to about 102 inches.

14. The shipping system of claim 9 wherein the at least one bulkhead pocket is a plurality of bulkhead pockets that are formed in sets to provide a variable distance that is a second distance.

15. The shipping system of claim 14 wherein the second distance is variable within a range of 1 to 10 inches.

16. The shipping system of claim 9 further comprising:
an anchoring rail of the trailer, wherein the first guide track is secured to the anchoring rail.

17. The shipping system of claim 10 further comprising:
an anchoring rail of the trailer, wherein the anchoring rail is configured to secure the bulkhead to the trailer.

18. A trailer comprising:
a towing element, wherein the towing element defines, for the trailer, a front portion at the towing element, a rear portion opposite the front portion, and opposing first and second side portions between the front portion and the rear portion,
a frame including side rails that define a perimeter of the trailer and have a plurality of side rail pockets;
a support surface including a plurality of inner rails, wherein each of the plurality of inner rails has a plurality of bulkhead pockets;
first and second guide tracks secured in the side rail pockets and defining a side accessible loading bay, wherein the first and second guide tracks span between the first and second side portions and are configured to retain a compressed rolling tarp system at a first height above the support surface such that the compressed rolling tarp system defines a space; and
first and second receivers secured in the bulkhead pockets, wherein the first and second receivers are configured to support a bulkhead above the support surface at a second height, the first height is greater than the second height, and the first height is sufficient to accommodate the second height of the bulkhead within the space.

19. The trailer of claim 18 wherein the plurality of side rail pockets are formed in first sets to permit the first and second guide tracks to be spaced closer together or further apart by a first distance that is in a first range of about 96 inches to about 102 inches and the plurality of bulkhead pockets are formed in second sets to provide a second distance that is variable within a second range of about 1 inch to about 10 inches.

* * * * *